ANALOG TO DIGITAL CONVERTERS

Filed Sept. 12, 1966

INVENTOR.
JACK R. MEYER
BY Charles J. Ungemach
ATTORNEY

INVENTOR.
JACK R. MEYER
BY Charles J. Ungemach
ATTORNEY

United States Patent Office 3,453,537

Patented July 1, 1969

3,453,537

ANALOG TO DIGITAL CONVERTERS

Jack R. Meyer, Columbia Heights, Minn., assignor to Honeywell Inc., Minneapolis, Minn., a corporation of Delaware Filed Sept. 12, 1966, Ser. No. 578,763
Int. Cl. G06g 7/06
U.S. Cl. 324—68 5 Claims

ABSTRACT OF THE DISCLOSURE

Apparatus for counting periodic pulses occurring during an interval of time. The periodic pulses are formed from first and second pulse trains, the second pulse train phase being shifted 180 degrees from the first. The first and second pulse trains are passed through coincidence gates during the interval of time to be measured and trigger first and second flip-flops respectively. Non-corresponding outputs of the flip-flops are received by an exclusive-or circuit the output of which is accumulated in a counter.

The general subject of the invention is analog-to-digital converters, particularly of the type wherein the time between two events is digitized by counting the number of pulses produced by a periodic pulse generator during the time between the two events.

In this kind of converter the pulses are gated to a counter during the time between events and an error of up to plus or minus one count is possible depending upon the time the gating period begins and ends with respect to the periodic train of pulses. The resolution of the system is limited by this error. Although there is still an error of up to plus or minus one count the affect of the error can be reduced by increasing the frequency of the pulse generator. Unfortunately this is not always feasible or practical. The present invention is primarily concerned with reducing the plus or minus one count error without increasing the pulse generator frequency. Secondarily the invention is concerned with providing a specific method or way of averaging.

Although the invention will be described in specific terms and with specific examples, this is merely illustrative and is not to be limiting in any way. The nature of the invention and the distinguishing features and advantages thereof will be understood from the following detailed description and accompanying drawings in which.

Figure 1:
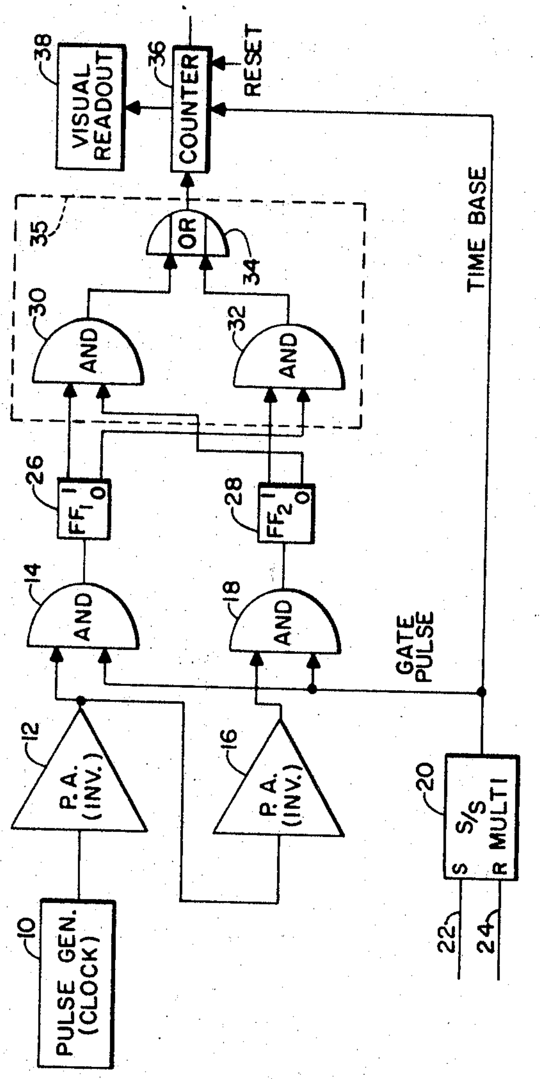
FIGURE 1 is a block diagram of a time-to-digital converter.

The converter of FIGURE 1 includes a pulse generator 10, also called a clock by those familiar with the art. The output of generator 10 is a train of periodic pulses. The pulses produced by generator 10 are amplified and inverted in a power amplifier 12. The inverted pulses at the output of amplifier 12 are fed to the first input of a coincidence or AND circuit 14 and also to the input of a second power amplifier 16. The output pulses of amplifier 16 are inverted with respect to the input pulses thereto and therefore are in phase with the pulses produced by generator 10. The pulses at the output of amplifier 16 are fed to the first input of a coincidence or AND circuit 18. Thus two trains of pulses are developed which are 180 degrees out of phase with each other. One train is present at the output of amplifier 12 and is fed to AND circuit 14 and the second train is present at the output of amplifier 16 and is fed to AND circuit 18. Amplifiers 12 and 16 operating as inverters provide phase splitting, in addition they shape or square the pulses and provide isolation for pulse generator 10 to prevent frequency pulling. Obviously, other means might be used to provide a pair of pulse trains 180 degrees out of phase with each other.

The output of a start-stop multivibrator 20 is fed to the second inputs of coincidence circuits 14 and 18. Multivibrator 20 has two inputs, a set input 22 and a reset input 24. A signal corresponding to the beginning of a time interval which is to be measured is applied to the set input 22, setting multivibrator 20 and a signal corresponding to the end of the time interval which is to be measured is applied to the reset input 24 which resets multivibrator 20. During the time between set and reset, multivibrator 20 generates a pulse which is used to gate AND circuits 14 and 18. Sometimes instead of saying that AND circuits 14 and 18 are gated it is said that they are enabled. During the gate time or enable time the pulse trains applied to the first inputs of AND circuits 14 and 18 are gated through the AND circuits and applied to flip-flops 26 and 28 respectively. Each of the flip-flops 26 and 28, also called binaries or bi-stable circuits, can operate in one of two possible states. This is designated by labeling the two outputs of each flip-flop with the numerals 1 and 0 respectively. Thus for purposes of explanation when flip-flop 26 is in a one-state the potential at output 1 is positive with respect to that at output 0 and when in a 0 state the potential at output 0 is positive with respect to that at output 1.

Non-corresponding outputs of flip-flops 26 and 28 are applied to the inputs of a pair of coincidence or AND circuits 30 and 32. Thus the output 1 of flip-flop 26 and output 0 of flip-flop 28 are connected to the first and second inputs respectively of AND circuit 30, and output 1 of flip-flop 28 and output 0 of flip-flop 26 are connected to the first and second inputs respectively of AND circuit 32. The single output of each AND circuit 30 and 32 is fed to the first and second inputs of an OR circuit 34. AND circuits 30 and 32 together with OR circuit 34 form an EXCLUSIVELY OR circuit 35. This combined circuit 35 operates to produce an output signal only when flip-flops 26 and 28 are in opposite states. It should be noted that the system could also be mechanized such that logic circuit 35 produces output signals only when flip-flops 26 and 28 are in the same state. The output of OR circuit 34 is fed to a counter 36 which has associated therewith a visual readout 38. The number of counts received by counter 36 is proportional to the time interval between the signals which are used to set and reset multivibrator 20.

Figure 2:
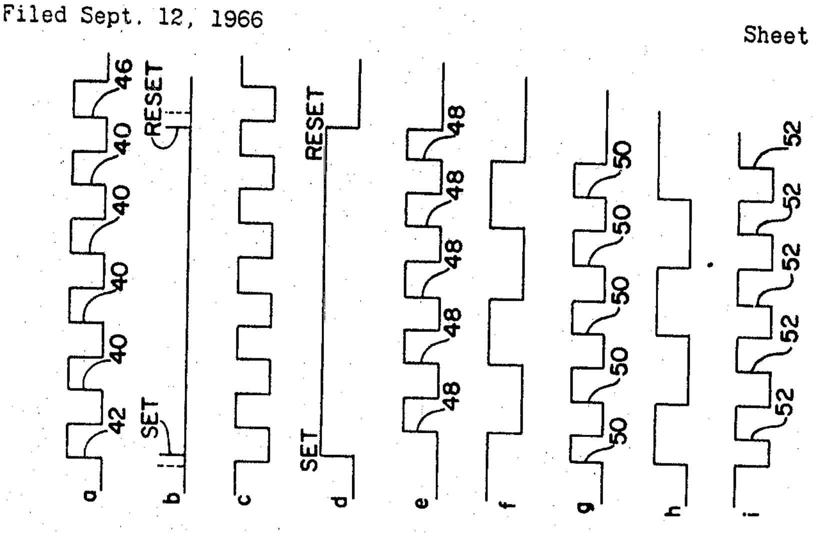
FIGURE 2 is a group or series of wave-forms which are useful in explaining the theory of operation of the converter of FIGURE 1.

The waveforms of FIGURE 2 are useful in describing the operation of the apparatus of FIGURE 1 and they are labeled with the letters (*a*) through (*i*). Waveform (*a*) a symmetrical square wave, corresponds to the output of pulse generator 10 and also to the output of power amplifier 16 because the output of amplifier 16 has been inverted twice with respect to the output of pulse generator 10. Waveform (*c*) corresponds to the output of power amplifier 12 and is merely the inverse of waveform (*a*). Waveform (*b*) corresponds to set and reset trigger signals which are normally applied to multivibrator 20. Note that the set and reset signals are very nearly five cycles apart with respect to waveform (*a*). Under ordinary circumstances however only 4 counts would be indicated, corresponding to the positive going edges of waveform (*a*) referenced by the numeral 40. Thus although the spacing, that is the time, between the set and reset signals of waveform (*b*) are very nearly five counting cycles apart, only four counts would be indicated and there would be an error approaching minus one count. Alternatively if the set and reset signals of waveform ($b$) are slightly greater than five counting cycles apart, six counts would be indicated and the error would approach plus one count. This is illustrated by moving the set and reset signals of waveform ($b$) slightly to the left and right of their original positions as shown by the solid vertical lines respectively and showing them as dashed vertical lines. Thus in addition to edges 40, edges 42 and 46 are picked up or counted and although the set and reset signals are only slightly greater than five counting cycles apart six counts would be indicated. The remaining waveforms will indicate how this error is reduced.

Waveform ($d$) corresponds to the output of multivibrator 20 which is applied to the second inputs of AND circuits 14 and 18. Waveform ($e$) corresponds to the output of AND circuit 14 which forms the input to flip-flop 26. Waveform ($e$) is equivalent to waveform ($c$) during the time that waveform ($d$) is shown in a set condition, i.e., during the time between the set and reset signals of waveform ($b$). The output of multivibrator 20 enables the coincidence circuits 14 and 18 allowing the pulse trains applied thereto to pass therethrough to the inputs of flip-flops 26 and 28. Waveform ($g$) corresponds to the output of AND circuit 18 which forms the input to flip-flop 28. Waveform ($g$) is equivalent to waveform ($a$) during the time between the set and reset signals of waveform ($d$). Waveform ($f$) corresponds to the output of flip-flop 26, for example at the 1 output thereof. The output waveform at the 0 output of flip-flop 26 would be the inverse of waveform ($f$) and accordingly is not shown. Note that flip-flop 26 as indicated in waveform ($f$) is originally in the one state and changes state in coincidence with each edge 48 in waveform ($e$). It should be noted that in this description positive going edges have been selected as the triggering events, but this is arbitrary and the negative going edges might just as well have been chosen. Waveform ($h$) corresponds to the output of flip-flop 28, for example at the 1 output thereof. The output waveform at the 0 output of flip-flop 28 is the inverse of waveform ($h$) and is not shown. Note that flip-flop 28 is indicated by waveform ($h$) is originally in the zero state and changes state in coincidence with each edge 50 in waveform ($g$).

Waveform ($i$) corresponds to the output of OR circuit 34 and is formed such that the output level is relatively positive whenever the levels of waveforms ($f$) and ($h$) are different. In other words there is an output signal whenever flip-flops 26 and 28 are in opposite states. Note that in the time interval between the set and reset signals in waveform ($b$), waveform ($i$) has five edges 52 where the signal level goes relatively positive. Counter 36 is responsive to edges 52 and in this case readout 38 would display a count of five which is closer to the actual time interval than a count of four which would be displayed if the signal represented by waveform ($a$) was gated directly to counter 36. It can be shown that if the actual time interval is between $N-\frac{1}{2}$ and $N+\frac{1}{2}$ counting cycles, where N is an integer greater or equal to one, then N counts will be indicated. This means that the plus or minus one count error has been reduced to plus or minus ½ count, corresponding to increased resolution without actually increasing the frequency of generator 10 which would be a common way of solving the problem. For various reasons however it may not be desirable or possible to increase the frequency of generator 10.

Figure 3:
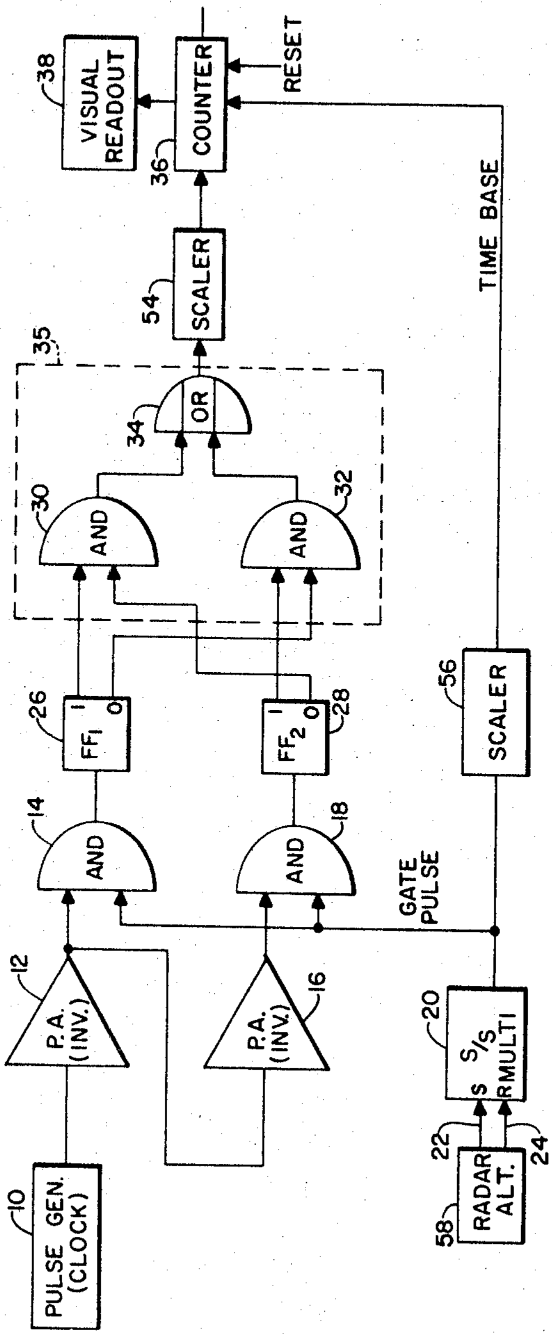
FIGURE 3 is a block diagram of a time-to-digital converter modified to average in accordance with a particular technique.

FIGURE 3 includes the apparatus of FIGURE 1 but also includes several additional circuits. A scaler circuit 54, which for example may be comprised of a series of flip-flops, is inserted between the output of OR circuit 34 and the input of counter 36. Scaler 54 merely scales down the output of OR circuit 34. For example if scaler 54 has a scale factor of four and the signal at the output of OR circuit 34 corresponds to 16 counts, then the resulting signal at the output of scaler 54 will correspond to four counts. A second scaler 56 provides an increased time base for counter 36 and is connected to receive the output signals from multivibrator 20. It for example might have a scale factor of 128 so that for each 128 gate or enable signals from multivibrator 20, corresponding to waveform ($d$) one signal is generated by scaler 56. In this way counter 36 and its associated readout 38 will accumulate and display the count received over 128 time intervals rather than a single time interval as referred to in describing FIGURE 1. In this way averaging can be accomplished which reduces the affect of the plus or minus ½ count error associated with the apparatus of FIGURE 1.

The use of a particular averaging technique will be described in conjunction with a radar altimeter 58 which supplies a first trigger signal coincident with a radar transmitter plus and a second trigger signal which is coincident with an echo or reflected pulse received by the altimeter. The first trigger and second trigger signals correspond to the set and reset signals respectively of waveform ($b$). Assume that the frequency of pulse generator 10 is 15.375 MHz. It can be shown that a 15.375 MHz. frequency has a period during which electromagnetic energy will travel 64 feet. Thus if energy is transmitted by a radar altimeter, travel to the earth's surface, is reflected by the surface of the earth, and travels back to the radar altimeter where it is recevied, during a time interval equivalent to the period of a 15.368 MHz. signal the craft on which the altimeter is located or mounted would be 32 feet from the surface of the earth. Thus it is said that one cycle of geneartor 10 or alternatively one count is equivalent to 32 radar feet. Therefore for example if the altitude is 240 feet, counter 36 of FIGURE 1 will either register 7 counts or 8 counts during each time interval corresponding to 240 feet. A count of 7 corresponds to 7 times 32 or 224 feet and a count of 8 corresponds to 8 times 32 or 256 feet. On the average, 7 counts would occur half of the time and 8 counts would occur the other half of the time. It can be seen that by averaging, the error can be reduced because the average count would be 7½, and 7½ times 32 is equivalent to 240 feet, the actual altitude.

The converter apparatus of FIGURE 3 provides an averaging function. Because of scaler 56 the count is averaged or accumulated over 128 time intervals. If scaler 54 was not present the total count in counter 36 would be approximately 7 times 64 plus 8 times 64 or 960 counts (using the previous example), that is during half the counting intervals (64) the count would be 7 and during the other half (64) the count would be 8. Scaler 54 has a scale factor of 4 and therefore the number of counts actually fed to counter 36 is 960 divided by 4 or 240 counts which is the actual altitude. Thus by chosing a pulse generator frequency such that the period thereof is equivalent to 32 radar feet, accumulating the number of pulses during 128 time intervals and scaling by 4 results in a count which is directly readable in radar feet, i.e. in this case altitude.

From this it is apparent that the ratio of the scale factor of scaler 56 and scaler 54 must be equivalent to the number of radar feet corresponding to the period of the pulse generator 10. Therefore in the example chosen the scale factor of scaler 56 divided by the scale factor of scaler 54 equals 128 divided by 4, or 32, the number of radar feet corresponding to the period of a 15.368 MHz. pulse generator.

It is to be understood that the arrangements described above are merely illustrative of the application of the principles of the invention. Others may be devised by those skilled in the art without departing from the spirit and scope of the invention.

What is claimed is:

1. An interval measuring system comprising in combination:

means for generating a first train of periodic pulses and a corresponding second train of periodic pulses, the second train having a phase shifted a predetermined amount with respect to that of the first pulse train;

gate pulse generator means for generating gate pulses having a length which is proportional to the interval to be measured;

gating means connected to receive the first and second trains of periodic pulses and the gate pulses and passing the pulse trains when they are coincident with the gate pulses;

first and second bistable elements connected to the gating means to receive the first and second pulse trains passed by the gating means respectively during the interval which is to be measured;

logical means connected to said bistable elements, producing output signals only when said elements are in predetermined states with respect to each other; and, a counter connected to said logical means for counting the output signals produced thereby.

2. The apparatus of claim 1 wherein the bistable elements are electronic flip-flops, and the logical means is an EXCLUSIVELY-OR circuit comprising two AND gates and an OR gate.

3. A time interval measuring system comprising in combination:

a pulse generator providing a first train of periodic pulses;

means connected to said pulse generator for generating a second train of pulses, said second train of pulses corresponding to the first train and having a fixed phase shift of 180 degrees with respect thereto;

a gate pulse generator providing gating pulses having a length which is proportional to the interval to be measured;

a coincidence gating means connected to receive the first and second pulse trains and the gating pulses and pass the pulse trains when they are coincident with the gating pulses;

first and second flip-flops each having a first and second output terminal, connected to receive the first and second pulse trains passed by the coincidence gating means, respectively, during the time interval which is to be measured;

logical signal means connected to the output terminals of said first and second flip-flops and producing output signals only when said flip-flops are in opposite states; and, a counter connected to said logical signal means counting the output signals produced thereby.

4. The system according to claim 1 wherein there is in addition a first scaling means, having a predetermined scaling factor, connected between said logical means and said counting means; and means for enabling said counter for a predetermined number of time intervals to be measured, the ratio of said number to said scale factor being another number which is substantially equal to one half the wavelength of the first and second periodic pulse trains.

5. The system according to claim 4 wherein said first scaling means has a scale factor of 4, the counter is enabled for 128 time intervals and, therefore, the ratio is 32.

References Cited

UNITED STATES PATENTS

| | | |
|---|---|---|
| 2,575,759 | 11/1951 | Higenbotham et al. |
| 2,702,367 | 2/1955 | Ergen. |
| 2,831,162 | 4/1958 | Gross. |
| 3,297,947 | 1/1968 | Riordan et al. |

RUDOLPH V. ROLINEC, *Primary Examiner.*

P. F. WILLE, *Assistant Examiner.*

U.S. Cl. X.R.

328—110